United States Patent [19]

Tsuda

[11] 4,040,174
[45] Aug. 9, 1977

[54] METHOD OF MANUFACTURING MAGNETIC HEADS

[75] Inventor: Naotsune Tsuda, Hachioji, Japan

[73] Assignee: Olympus Optical Co., Ltd., Tokyo, Japan

[21] Appl. No.: 703,508

[22] Filed: July 8, 1976

[30] Foreign Application Priority Data

July 31, 1975 Japan .................................. 50-93768

[51] Int. Cl.² .............................................. G11B 5/42
[52] U.S. Cl. ......................................... 29/603; 29/467
[58] Field of Search ........................ 29/603, 418, 467; 360/119, 121

[56] References Cited

U.S. PATENT DOCUMENTS

| 3,375,575 | 4/1968 | Visser et al. | 29/603 |
| 3,824,685 | 7/1974 | Burch et al. | 29/603 |

Primary Examiner—Carl E. Hall
Attorney, Agent, or Firm—Ostrolenk, Faber, Gerb & Soffen

[57] ABSTRACT

A method of manufacturing magnetic heads comprises the steps of providing a pair of core block pieces which are used to form magnetic heads, the core block pieces having gap defining surfaces formed thereon; cutting part of one of the core block pieces including the gap defining surface thereof to provide a pair of end block pieces; forming a thin film of a thickness corresponding to a desired gap length on the opposite surface of the end block pieces from the surface on which the gap defining surface is located to thereby form offset block pieces, and subsequently disposing them to either side of the remainder of said one core block piece with their lower surfaces lying on a common plane; or alternatively disposing the end block pieces on a pair of raised steps formed adjacent to the opposite sides of a stepped table, with the remainder of the one core block piece disposed on a central recess located between the steps of the table which is at a lower elevation than the steps by an amount corresponding to a desired gap length; disposing the other core block piece on top of said one block piece so that their gap defining surfaces are located opposite to each other; causing a gap forming material to melt and permeate into clearances which are formed between the gap defining surfaces of the upper and lower core block pieces as a result of the offset or the step, solidifying the gap forming material to produce a core block in which a desired gap is formed, and cutting the core block to size, thereby producing a plurality of cores.

5 Claims, 19 Drawing Figures

METHOD OF MANUFACTURING MAGNETIC HEADS

BACKGROUND OF THE INVENTION

The performance of magnetic heads is dominated by the accuracy of a gap formed therein. A gap in a small size or miniature magnetic head has a very small length of the order of 1 to 2 microns, and extreme difficulties are experienced in forming such a gap with a high accuracy. In the prior art practice, a gap of the kind described has been formed by disposing a pair of core block pieces in abutting relationship so that their gap defining surfaces are located opposite to each other, with a thin sheet of mica or metal foil interposed therebetween as a spacer. Subsequently molten ceramic or like material is caused to permeate into the clearance thus formed, and then allowed to be solidify. However, the spacer material used in this technique in expensive in itself and must be worked to a thickness of 1 to 2 microns with a high accuracy, resulting in an overall cost increase for the manufacture of cores.

SUMMARY OF THE INVENTION

It is an object of the invention to provide a method of manufacturing magnetics heads which avoids above difficulties experienced with the formation of a small length gap and which permits cores having a high accuracy gap to be easily obtained without the use of spacers.

In accordance with the invention, there are provided a pair of core block pieces each having a gap defining surface. One of the core block pieces including its gap defining surface is partially cut to provide a pair of end block pieces, on the opposite surface of which is formed a thin film of a thickness which corresponds to a desired gap length. The end block pieces are disposed in juxtaposition on the opposite sides of the remainder of the core block piece so that their lower surfaces lie on a common plane. Alternatively, the end block pieces are disposed on a pair of raised steps formed adjacent to the opposite sides of a stepped table having a central recess which is at a lower elevation than the steps by an amount corresponding to the desired gap length. Another core block piece is disposed on top of the first mentioned core block piece so that their gap defining surfaces are located opposite to each other, and a gap forming material is caused tomelt and permeate into clearances which are formed between the gap defining surfaces of the upper and lower core block pieces as a result of the step in the first core block piece or the table. The gap forming material is allowed to solidify, thereby providing a core block in which a desired gap is formed. The resulting core block is cut to size to produce a plurality of cores. In this manner, a high accuracy gap can be formed in the cores at a reduced cost.

DETAILED DESCRIPTION OF EMBODIMENTS

Figure 1:
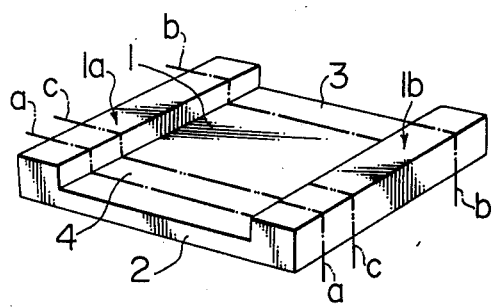
FIG. 1 is a perspective view of one of core block pieces which are used to form together a core block.

Referring to the drawings, several embodiments of carrying out the method of manufacturing magnetic heads according to the invention will be more fully described. FIGS. 1 to 8 illustrate various manufacturing steps of a first embodiment. Referring to FIG. 1, there is provided a core block piece 1 of a sintered oxide, ferromagnetic material which is formed with projections along its opposite lateral edges on which a pair of elongate gap defining surfaces 1a, 1b are formed. The two gap defining surfaces of the core block piece 1 are optionally polished so as to lie in a common plane, and subsequently the core block piece 1 is cut along planes indicated by phantom lines a, b which are located adjacent to the front and rear ends thereof, thus separating a piece of small end pieces 2, 3. Another phantom line c is indicated in FIG. 1, illustrating another plane along which the core block piece 1 may be cut to produce one of the small pieces.

Figure 2:
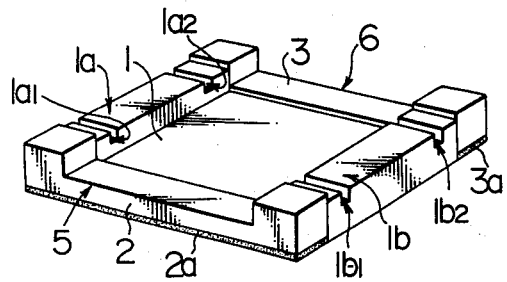
FIG. 2 is a perspective view of offset block pieces which are juxtaposed with the remainder of said one core block piece of FIG. 1.

A pair of thin films 2a, 3a (see FIG. 2) having a thickness corresponding to a desired gap length is formed on the lower surface of the small pieces 2, 3 that is on the opposite surface from the surface in which the gap defining surfaces 1a, 1b are located, as by adhesion of a metal foil or a plastic sheet or by evaporation of a similar material. In this manner, a pair of offset block pieces 5, 6 having an ncreased height are formed. Offset block pieces 5, 6 are disposed in juxtaposition with the remainder of the starting core block piece 1 in a manner similar to that before they are cut therefrom, as illustrated in FIG. 2. It will be noted that the upper surface of the block pieces 5, 6 are at a higher elevation than the gap defining surfaces 1a, 1b of the remainder of the core block piece 1 by an amount which corresponds to the thickness of the thin films 2a, 3a. In the present embodiment, grooves 1a1, 1b1, 1b2 are formed in both gap defining surfaces 1a, 1b toward their opposite ends for preventing the flow of a gap forming material toward the offset pieces 5, 6. In certain circumstances, however, these grooves may be omitted.

Figure 3:
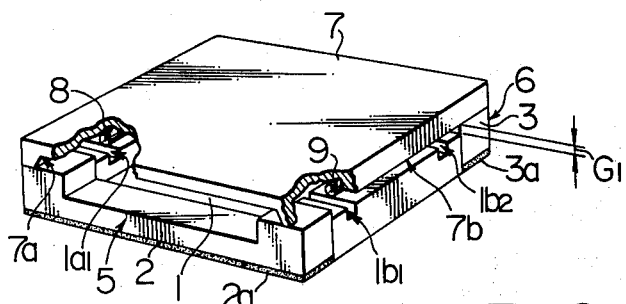
FIG. 3 is a perspective view of the both core block pieces which are assembled in position.

As shown in FIG. 3, another core block piece 7 is disposed at top of the core block piece 1 and the end block pieces 5, 6 so that their gap defining surfaces are located opposite to each other. The core block piece 7 is substantially similar in configuration to the core block piece 1 before it is cut, except that the inner sidewalls contiguous with its gap defining surfaces 7a, 7b are tapered or inclined. When the various block pieces 1, 5, 6 and 7 are assembled together in this manner, a clearance $G_1$ having a length corresponding to the thickness of the thin films 2a, 3a is formed between the gap defining surfaces of the core block pieces 1, 7. A pair of round glass rods 8, 9 are disposed inside and adjacent to the clearance $G_1$, and after a weight (not shown) is placed on the upper core block piece 7, the assembly is heated in a furnace chamber to a temperature above the melting point of the glass, using an inert gas atmosphere. Upon heating, the glass rods 8, 9 melt to permeate into the clearance $G_1$. Upon completion of the permeation, the assembly is removed from or left in the furnace chamber to allow it to be cooled down in the ambient air. Thereupon, the glass which has permeated into the clearance is solidified, bonding the core block pieces 1, 7 together.

Figure 4:
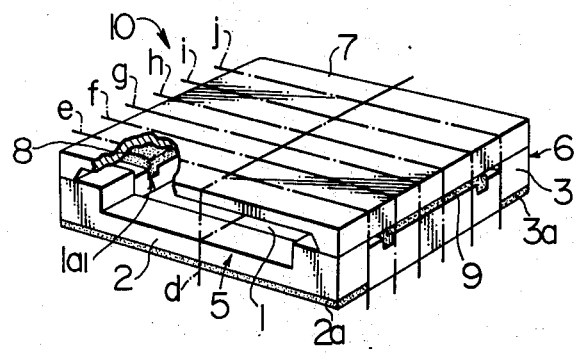
FIG. 4 is a perspective view of a core block which is obtained by the assembly shown in FIG. 3.
Figure 5:
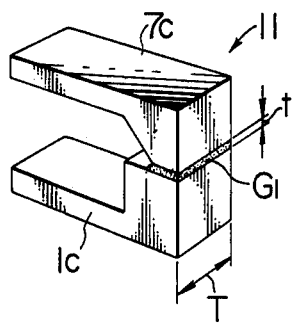
FIG. 5 is a perspective view of a magnetic core which is cut from the core block shown in FIG. 4.

The resulting core block 10 shown in FIG. 4 is cut along a plane indicated by a phantom line $d$ shown in FIG. 4, and then sliced along planes indicated by phantom lines $e$ to $j$, thereby providing a plurality of cores. One of these is shown in FIG. 5 by a core 11 having core pieces 1c, 7c and a gap $G_1$. The gap length $t$ of the core 11 is determined by the thickness of the thin films 2a, 3a while the track width T is determined by the spacing between the phantom lines $e$ to $j$ which are chosen as the slicing line of the core block 10.

Figure 6:
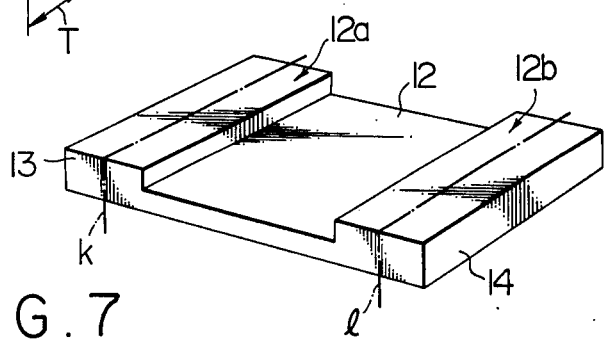
FIG. 6 is a perspective view, illustrating another manner of cutting the starting core block piece.
Figure 7:
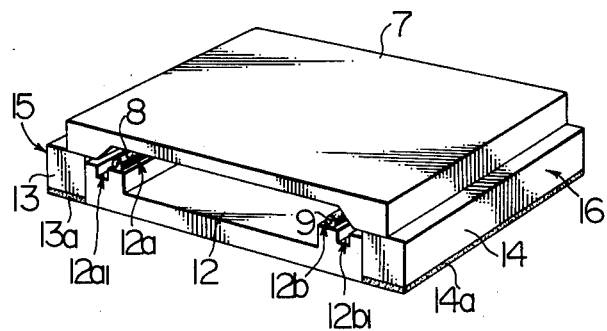
FIG. 7 is a perspective view of an assembly of block pieces when the offset block piece obtained by utilizing the manner of cutting shown in FIG. 6 is employed.

FIG. 6 shows a core block piece 12 having a pair of gap defining surfaces 12a, 12b of an increased width. Adjacent to the opposite lateral sides, the core block piece 12 is cut along planes indicated by phantom lines $k$, $l$ to produce small end pieces 13, 14 in the form of square pillars. A pair of thin films 13a, 14a are provided on the lower surface of the square pillars 13, 14, generally in a manner similar to that in which the thin films 2a, 3a are applied. The end block pieces can then be used as offset block pieces 15, 16, as shown in FIG. 7. At this time, they are disposed in juxtaposition with the opposite lateral sides of the remainder of the core block piece 12. A process similar to that mentioned above may be applied to the assembly shown in FIG. 7, thereby producing a core block similar to the core block 10 shown in FIG. 4. In this instance, a pair of lengthwise extending grooves 12a1, 12b 1 are formed in the gap defining surfaces 12a, 12b to prevent a flow of molten glass into any space which may be formed beween the core block piece 12 and the offset block pieces 15, 16.

Figure 8:
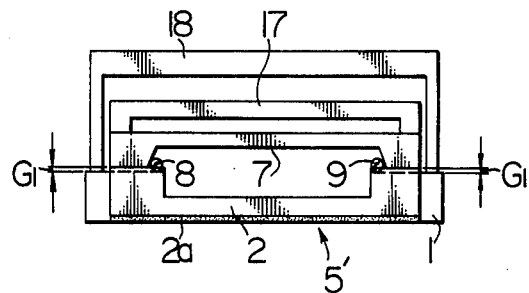
FIG. 8 is a side elevation of the assembly of core block pieces, illustrating, in particular, the application of weight.

When the various block pieces are assembled in the manner similar to that shown in FIG. 3 and a weight placed thereon, it will be appreciated that the lower core block piece 12 is not subjected to the pressure of the weight. To avoid this, the axial ends of the offset blocking pieces may be cut off to provide offset block piece 5' of a reduced length so that the remainder of the core block piece 1 extends beyond the opposite ends of the offset block piece 5', as shown in FIG. 8. A weight 17 is disposed on top of the upper core block piece 7, and another weight 18 is disposed so as to bear against the extended ends of the lower core block piece 1.

The gap forming material employed in the method of the invention may comprise a glass material in rod, powder or block form. Alternatively, it may comprise any other gap forming material such as ceramic or enamel. In addition, the end or offset block pieces mentioned above may be replaced by cubic blocks disposed at the corners of the remainder of the core block piece.

Since no spacer is used in the method of the invention, a commensurate reduction in the cost is achieved while allowing an efficient production of a high accuracy core by the use of offset block pieces which maintain the required accuracy of the gap length. In addition, since the location where the gap forming material is placed is remote from the position of the thin films on the end block pieces, the melting of the gap forming material has no adverse influence upon the dimensional accuracy of the resulting cores.

Figure 9:
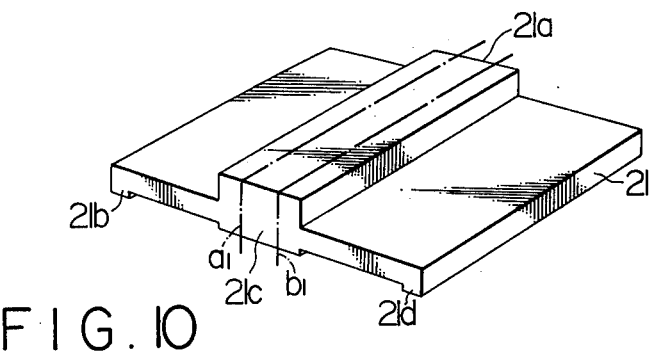
FIG. 9 is a perspective view of one of core block pieces used to form a core block in accordance with another embodiment of the invention.
Figure 10:
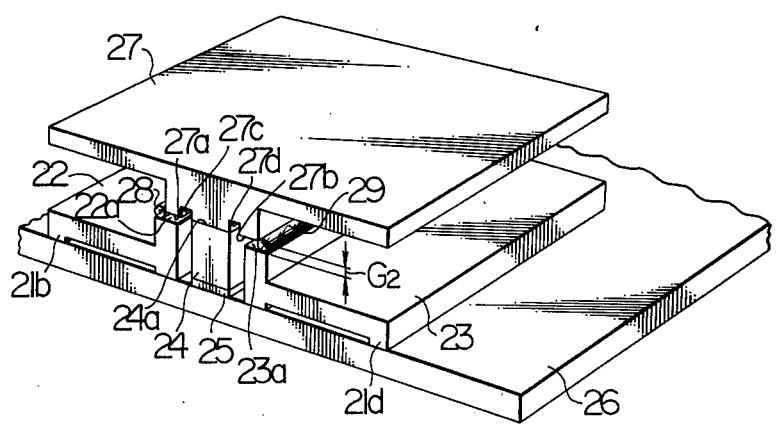
FIG. 10 is a perspective view of the core block piece shown in FIG. 1 on which another core block piece is placed after said one core block piece has been cut apart.
Figure 11:
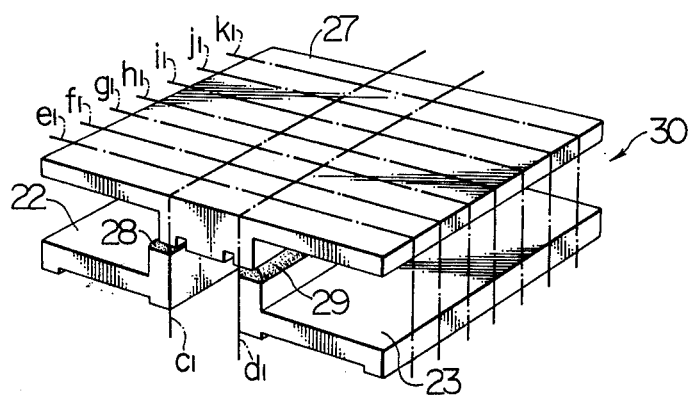
FIG. 11 is a perspective view of a resulting core block.

Referring to FIGS. 9 to 11, there is shown another embodiment of the invention. In this embodiment, there is provided a pair of core block pieces each of which is provided with a longitudinally extending central projection on which a gap defining surface is formed. One of the core block pieces is cut along a pair of spaced parallel planes which extends longitudinally of the central projection to separate a center block piece, which is then provided with a thin film of a thickness corresponding to a desired gap length on the surface remote from the gap defining surface. Subsequently, the remaining moieties of the core block piece are disposed on a flat plane in juxtaposition with the center block piece located therebetween, and the other core block piece is disposed on top thereof so that their gap defining surfaces are located opposite to each other. In this manner, the desired gaps are formed between the gap defining surfaces of the upper and lower core block pieces.

More specifically, referring to FIG. 9, a core block piece 21 is formed of a sintered oxide, ferromagnetic material, and is subtantially T-shaped having a vertical projection 21a on which a gap defining surface and an abutment surface are formed as will be described later. On its lower surface, the core block piece 21 is additionally formed with projections 21b, 21c, 21d. The top surface of the projection 21a is optically polished to be in a single plane, and is then cut along planes indicated by phantom lines $a_1$, $ba_1$ to produce a pair of L-shaped blocks 22, 23 and a center block 24 (see FIG. 10). On the surface remote from the abutment surface 24a, or on its lower surface, the center block 24 is provided with a thin film 25 of a thickness corresponding to a desired gap length, which may be formed by adhesion of a metal foil or a plastic sheet or by evaporation of similar material upon the block 24. The center block 24 is disposed on a flat table 26, and the L-shaped blocks 22, 23 are spaced therefrom on opposite sides thereof, the blocks 22 to 24 being disposed so that their sections are parallel to each other. It will be noted that the upper surface of the center block 24 is at a higher elevation than the gap defining surfaces 22a, 23a of the L-shaped blocks 22, 23 by an amount which corresponds to the thickness of the thin film 25.

As shown in FIG. 10, another core block piece 27 is disposed on top of the center block 24 and the L-shaped blocks 22, 23. The core block piece 27 is generally similar in size and configuration to the core block piece 21 before the latter is cut, and includes a pair of gap defining surfaces 27a and 27b. A pair of grooves 27c, 27d are formed in the core block piece 27 for preventing flow of molten gap forming material toward the center block. When the blocks 22 to 24 and the core block piece 27 are assembled in this manner, clearances $G_2$ of a length corresponding to the thickness of the thin film 25 are formed between gap defining surfaces. A pair of round glass rods 28, 29 are disposed outside the clearances $G_2$, and then are introduced into a furnace chamber to be heated to a temperature above the melting point of the glass in an inert gas atmosphere. Upon heating, the glass 28, 29 melts to permeate into the clearances $G_2$, whereupon the assembly is either removed or left in the furnace chamber to be allowed to cool down in air. The glass which permeated into the clearances becomes solidified while filling them, thus bonding the L-shaped blocks 22, 23 and the core block piece 27 together. In this manner, a core block 30 is obtained as shown in FIG. 11, and may be cut and sliced along planes indicated by phantom lines $c_1, d_1, e_1, \ldots, k_1$, thus producing a plurality of cores. The gap length of the core depends on the thickness of the thin film 25 while the track width is determined by the spacing between the phantom lines $e_1, f_1, \ldots, k_1$.

As mentioned previously in connection with the first embodiment, the glass material 28, 29 may be in any form such as a rod, or powder or a block, and in addition any other suitable gap forming material such as ceramic or enamel may be used. The advantages which have been mentioned above in connection with the first embodiment and which are achieved by carrying out the method of the invention also apply to this embodiment.

Figure 12:
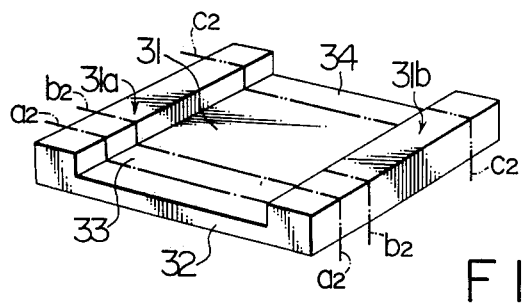
FIG. 12 is a perspective view of one of core block pieces used to form a core block in accordance with a third embodiment of the invention.
Figure 13:
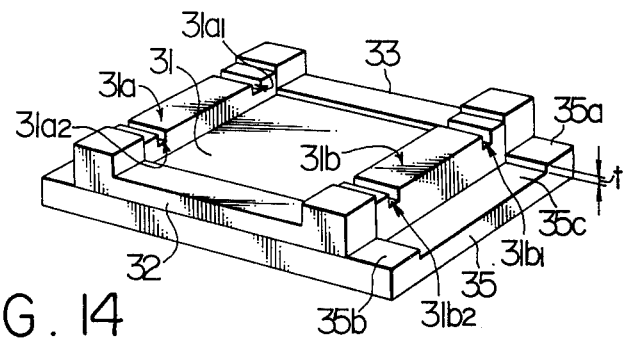
FIG. 13 is a perspective view of the core block piece shown in FIG. 12 which is placed on a stepped table.

In the embodiment described above, a differential elevation required for forming the gap has been obtained by applying a thin film to the opposite surface of a fragment of the original core block piece which is remote from the gap defining surface, and disposing the fragment piece in juxtaposition with the remainder of the core block piece. However, a similar result may be obtained using a table which is centrally formed with a recess of a depth corresponding to a desired gap length and in which a center block cut from the original core block piece is disposed in juxtaposition with the remainder of the core block piece which are located on the opposite side thereof. Referring to FIGS. 12 to 19, there is shown a third embodiment of the invention which incorporates such concept. FIG. 12 shows a core block piece 31 formed of a sintered oxide, ferromagnetic material and having a pair of projections along its opposite lateral edges on which a pair of elongate gap defining surfaces 31a, 31b are formed. The two gap defining surfaces are optically polished to lie in a common plane, and the core block piece 31 is cut along planes indicated by phantom lines $a_2, b_2$ to provide a pair of end block pieces 32, 33. The cutting may alternatively be effected along the phantom line $a_2$ and another phantom line $c_2$. As shown in FIG. 13, the end block pieces 32, 33 and the remainder of the core block piece 31 are disposed on a table 35 which is provided with edge portions 35a, 35b which are at a higher elevation than a center recess 35c formed therein by an amount $t$, which is chosen to be equal to a desired gap length in the core to be produced. The end block pieces 32, 33 are disposed on the respective edge portions 35a, 35b while the remainder of the core block piece 31 is placed in the center recess 35c. In the example shown, grooves 31a1, 31a2, 31b1, 31b2 are formed in the gap defining surfaces 31a, 31b toward their axial ends for preventing the flow of molten gap forming material toward the end block pieces 32, 33. However, the provision of these grooves is not essential.

Figure 14:
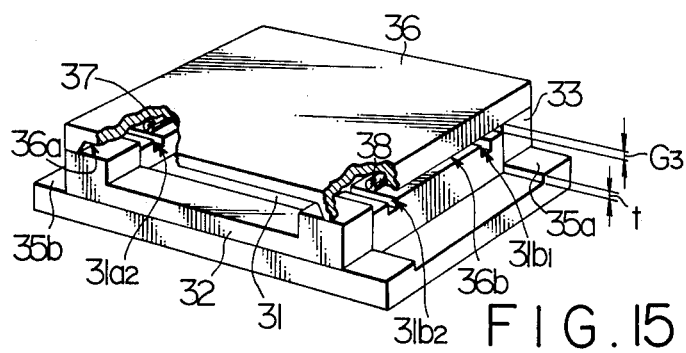
FIG. 14 is a perspective view of an assembly comprising the core block pieces and the table and including glass rods when they are disposed in their given position on the table.

As shown in FIG. 14, another core block piece 36 is disposed on top of the core block piece 31 and the end block pieces 32, 33 all of which are placed on the table 35, with the core block piece 36 being located so that its gap defining surfaces are located opposite to those of the core block piece 31. As before, the core block piece 36 is similar in size and configuration to the core block piece 31 before it is cut, except the inner wall portions contiguous with the gap defining surfaces 36a, 36b are tapered or inclined. When the block pieces 31, 32, 33 and 36 are assembled together in this manner, clearances $G_3$ of a length corresponding to the amount $t$ are formed between the gap defining surfaces of the upper and lower core block pieces 36, 31 as a result of the upper core block piece 36 bearing against the end block pieces 32, 33 which in turn respectively bear against the edge portions 35a, 35b of the table 35 having a higher elevation.

A pair of round glass rods 37, 38 are disposed inside the clearance $G_3$. While not shown, a weight is placed on top of the upper core block piece 36 and the assembly is introduced into a furnace chamber to be heated to a temperature above the melting point of the glass in an inert gas atmosphere such as nitrogen. Upon heating, the glass material 37, 38 melts to permeate into the clearance $G_3$. Upon completion of the permeation, the assembly may be removed from or left in the furnace chamber to be cooled down in air. Thus the glass which has permeated into the clearances is allowed to solidify while filling the clearances, thus bonding both core block pieces 31, 36 together to produce a core block 40 as shown in FIG. 15.

Figure 15:
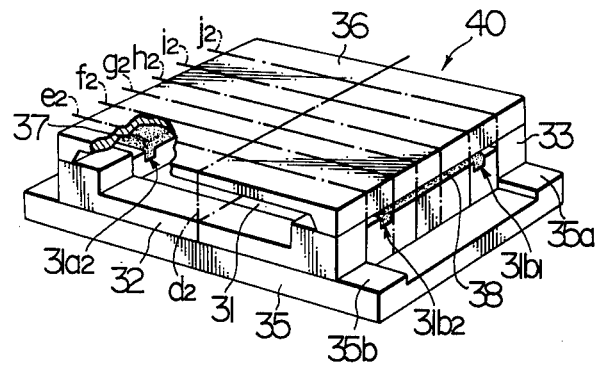
FIG. 15 is a perspective view of a core block obtained from the assembly shown in FIG. 14.
Figure 16:
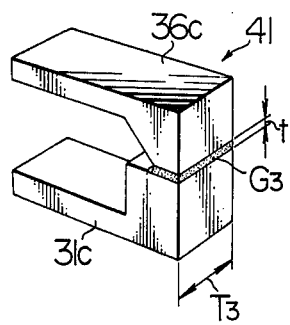
FIG. 16 is a perspective view of a core which is obtained from the core block shown in FIG. 15.

The resulting core block 40 may be cut and sliced along planes indicated by phantom lines $d_2, e_2, \ldots, j_2$ shown in FIG. 15, thereby producing a plurality of cores. One core 41 is shown in FIG. 16 as having core pieces 31c, 36c and a gap $G_3$. It will be understood that the length $t$ of the gap $G_3$ in the core 41 is determined by the difference in elevation between the edge portions and the center recess of the table 35 while the track width $T_3$ is determined by the spacing between the slicing lines $e_2$ to $j_2$.

Figure 17:
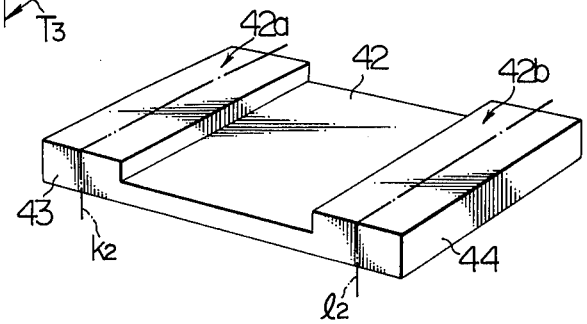
FIG. 17 is a perspective view, illustrating another manner of cutting the starting core block piece.
Figure 18:
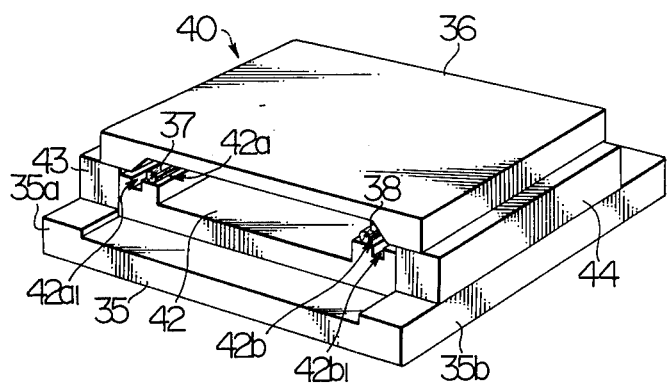
FIG. 18 is a perspective view of the assembly corresponding to FIG. 14 when the manner of cutting illustrated in FIG. 6 is employed.

FIG. 17 shows a core block piece 42 having a pair of gap defining surfaces 42a, 42b of an increased width. Adjacent to the opposite lateral sides, the core block piece 42 is cut along planes indicated by phantom lines $k_2, l_2$, thus providing a pair of end block pieces 43, 44 which are in the form of square pillars. As shown in FIG. 18, the end blocks 43, 44 and the remainder of the core block piece 42 are disposed on the table 35 which is identical to the one described above. A similar process may be applied to the assembly as mentioned above in connection with FIGS. 12 to 16, thereby providing a core block which is similar to the core block 40 shown in FIG. 15. In this instance, the grooves 42a1, 42b1 may be formed lengthwise in the gap defining surfaces 42a, 42b for preventing the flow of molten glass into any space which may be formed between the core block piece 42 and the end block pieces 43, 44. However, as mentioned previously, the provision of these grooves is not essential.

Figure 19:
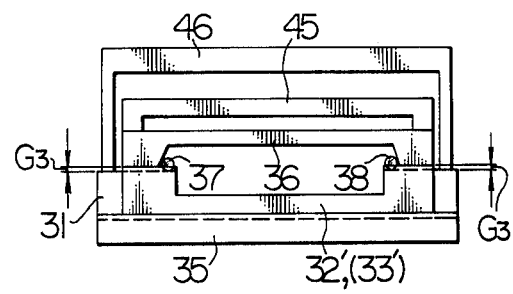
FIG. 19 is a side elevation of the assembly, illustrating the application of weight thereto.

It will be noted from FIG. 18 that when the various block pieces are assembled as shown, the body of the lower core block piece 42 will not be subjected to the pressure of the weight. To prevent this, the axial ends of the end block pieces may be cut short (32', 33') so that the core block piece 31 extends beyond them, as illustrated in FIG. 19. A weight 45 may be placed on the upper core block piece 36, and another weight 46 may be placed so as to bear against the extended ends of the lower block piece 31.

As mentioned above, the gap forming material may be in any form such as rod, powder or block form and may comprise any material other than glass such as ceramic or enamel. As before, the end block pieces may be replaced by cubic blocks which are disposed at the corners of the remainder of the core block piece. In this embodiment, since no thin film is applied to the end block pieces, any adverse influence of the melting of the gap forming material upon the core assembly is avoided. In addition, the previously mentioned advantages of the invention, that is, a reduction in the manufacturing cost while retaining the high accuracy of the gap length in the cores and providing an efficient manufacturing process, remain.

I claim:

1. A method of manufacturing magnetic heads comprising the steps of providing a pair of core block pieces each having a gap defining surface, cutting one of the core block pieces through the gap defining surface to provide a pair of fragment pieces, applying a thin film of a thickness corresponding to a desired gap length on the surface of the fragment pieces which is opposite to the gap defining surface to thereby provide a pair of offset block pieces, disposing the offset block pieces in juxtaposition with the remainder of said one core block piece, disposing the other core block piece on top of said one core block piece and the offset block pieces so that their gap defining surfaces are located opposite to each other, causing a gap forming material to melt and permeate into clearances which are formed between the pair of core block pieces as a result of the presence of the thin film, solidifying the gap forming material to provide a core block in which a gap is formed between the both core block pieces, and cutting and slicing the core block to size, thereby producing a plurality of magnetic cores.

2. A method of manufacturing magnetic heads according to claim 1 in which the thin film is formed by evaporation.

3. A method of manufacturing magnetic heads according to claim 1, further including the step of forming grooves in the gap defining surface of the fragment pieces adjacent to its opposite ends for receiving any excess amount of molten gap forming material in order to prevent its flow into the abutting area between the end block pieces and the remainder of said one core block piece.

4. A method of manufacturing magnetic heads comprising the steps of providing a pair of core block pieces each having a gap defining surface, one of the core block pieces being T-shaped in cross section and having a central projection, cutting said one core block piece through the central projection to provide a pair of L-shaped blocks and a center block, providing the center block with a gap defining member of a thickness substantially corresponding to a desired gap length, disposing the pair of L-shaped blocks and the center block on a table in the same manner as they assumed before they are cut from the one core block piece but in spaced relationship from each other, disposing the other core block piece on top of the L-shaped blocks and the center block so that their gap defining surfaces are located opposite to each other to form gaps therebetween, disposing a gap filling material such as glass rods or chips adjacent to the gaps, heating and melting the gap filling material to cause it to fill gaps and to bond the L-shaped blocks and said other core block piece together, thereby providing a core block, and cutting and slicing the core block to size, thereby producing a plurality of magnetic cores.

5. A method of manufacturing magnetic heads comprising the steps of providing a pair of core block pieces each having a gap defining surface, cutting one of the core block pieces through its gap defining surface to provide a pair of end block pieces, providing a table having a central recess which is at a lower elevation than its opposite edge portions by an amount corresponding to a desired gap length, placing the pair of end pieces on the edge portions of the table and the remainder of said one core block piece on the central recess in the table, disposing the other core block piece on top of the end block pieces and the remainder of said one core block piece so that their gap defining surfaces are located opposite to each other, forming clearances between the both core block pieces as a result of said other core block piece bearing against the pair of end block pieces and being spaced from the remainder of said one core block piece located in the central recess of the table, filling said clearances with the gap defining material to provide a core block, and cutting and slicing the core block to size, thereby producing a plurality of magnetic cores.

* * * * *